United States

La Roche

4,025,161

May 24, 1977

[54] ELECTRO-OPTICAL LIQUID-CRYSTAL DISPLAY DEVICE

[75] Inventor: Ulrich La Roche, Zurich, Switzerland

[73] Assignee: BBC Brown Boveri & Company, Limited, Baden, Switzerland

[22] Filed: Oct. 16, 1974

[21] Appl. No.: 515,336

[30] Foreign Application Priority Data

Nov. 12, 1973 Switzerland .................. 15876/73

[52] U.S. Cl. .................. 350/160 LC; 350/156; 350/157

[51] Int. Cl.² .................................. G02F 1/13

[58] Field of Search ............ 350/160 LC, 111, 150, 350/156, 157

[56] References Cited

UNITED STATES PATENTS 3,756,694  9/1973  Soref et al. .................. 350/160 LC

*Primary Examiner*—Edward S. Bauer
*Attorney, Agent, or Firm*—Oblon, Fisher, Spivak, McClelland & Maier

[57] ABSTRACT

An electro-optical liquid-crystal display device is disclosed which retains its contrast even when viewed through an intervening plane polarizer. This objective is achieved by supplementing the plane polarizer on the viewing side of the display device with a λ/4 layer such that the plane polarizer together with the λ/4 layer form a circular polarizer.

5 Claims, 1 Drawing Figure

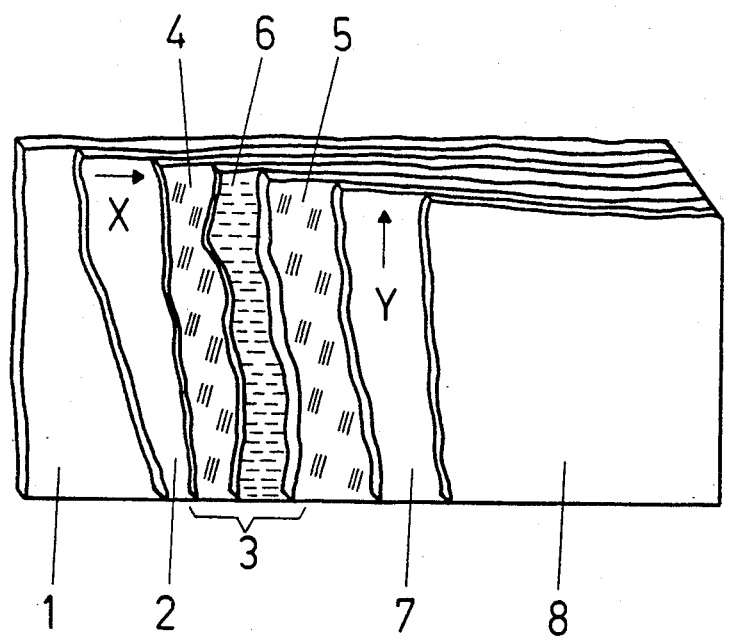

ELECTRO-OPTICAL LIQUID-CRYSTAL DISPLAY DEVICE

BACKGROUND OF THE INVENTION

1. Field of the Invention

This invention relates generally to an electro-optical liquid-crystal display device and more particularly to an electro-optical liquid-crystal display device with two plane polarizers having between them an electro-optical layered structure comprising two parallel, transparent plates provided with electrodes, the plates enclosing a layer of a nematic liquid crystal with wall orientation.

2. Description of the Prior Art:

The operating principle of devices of the type mentioned above is based on the ability to control by means of an electric field the optical activity of a nematic liquid crystal with wall orientation.

Liquid-crystal configurations are known (e.g. DT-OS 2,158,563; DT-OS 2, 202, 555; DT-OS 2, 214, 891; U.S. Pat. No. 3,731,986 ) which exhibit a polarization effect and alter their polarization properties in an electric field. If the electric field is discontinued the substances resume their original polarizing property. A corresponding electro-optical display device comprises in general two parallel, transparent glass plates which are coated on their inner surface with electrodes in accordance with a character to be displayed, and which are surrounded by polarizers. The electrode material can be, for example, a thin, o ptically transparent coating of a n electrically conducting material, such as stannic oxide. Between the two glass plates, which are held at a specified distance from each other by means of a plastic foil, of polytetrafluoroethylene (Teflon) for example, is the layer of nematic liquid crystal, the two glass plates exhibiting wall orientation on their surfaces facing the liquid crystal. The electrodes, or conductors connected to them, include external terminals to allow application of an external voltage. Ambient light passing through the layered structure emerges on the observer's side of the device in the form of plane-polarized light. If a display device of this kind is viewed through a plane-polarizing system, e.g. through polarizing sunglasses, the display contrast perceivable by the eye is dependent on the orientation of the sunglasses relative to the display device. In the most unfavourable case the contrast can disappear completely.

SUMMARY OF THE INVENTION

Accordingly, one object of this invention is to overcome the above described disadvantage and to create a liquid-crystal display device which retains its contrast even when viewed through an intervening plane polarizer, regardless of the rotary orientation of the polarizer.

Briefly, this and other objects of the invention are achieved in that the plane polarizer on the viewing side of a liquid-crystal display device is supplemented by a λ/4 (quarter wavelength) layer such that the plane polarizer and the λ/4 layer together form a circular polarizer. The light emerging from the display device is then circularly polarized. An interposed plane polarizer, such a s polarizing sunglasses, transmits circularly polarized light uniformly, irrespective of o rientation. The display contrast is therefore maintained when viewed through polarizing sunglasses, regardless of their rotary orientation relative to the display device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The single FIGURE shows in schematic form the cnstruction of a reflecting liquid-crystal display device in accordance with the present invention.

DESCRIPTION OF THE PREFERRED EMBODIMENT

Referring now to the FIGURE, a diffuse reflector 1 has laid upon it a first plane polarizer 2. On top of this is mounted an electro-optical layer structure 3 comprising a first glass plate 4, a second glass plate 5 and between them a layer 6 of a nematic liquid crystal. The surface of the glass plates facing the liquid crystal have wall orientations which are crossed with respect to each other and which are created by rubbing with cotton wool, for example. Electrodes arranged according to the character to be represented are mounted on the inner sides of glass plates 4 and 5. An external voltage source, not shown, can be connected to the electrodes. On the electro-optical layer structure 3 is a second plane polarizer 7, of which the direction of polarization Y is turned through 90° relative to the direction of polarization X of the first polarizer 2. On the second plane polarizer 7 there is a λ/4 layer which together with the second plane polarizer 7 forms a circular polarizer.

Through special measures taken in the manufacture of the electro-optical layer structure 3 and by selecting suitable liquid-crystal materials, it is possible to cause the molecules of the liquid crystals to be wall-orientated, i.e. on the surface of the first glass plate 4 they are arranged in one direction, while on the surface of the second glass plate 5 they are arranged in another direction at right angles to the first. The nematic layer 6 thus has the effect of turning through 90° the polarization direction of polarized light passing through it. Plane-polarized light falling on the layer in a certain direction therefore emerges from the layer with its direction of polarization rotated through 90 °. Rotation of the polarization direction ceases, however, when an electric field is applied, so that in this case the polarization direction of the light is preserved on passing through the nematic layer 6. When the two polarizers 2 and 7 are arranged crosswise, the effect of this phenomenon is that the display device normally reflects incident ambient light, i.e. it appears bright, and under the influence of an electric field, when a voltage is applied, it appears dark owing to the effect of the crossed polarizers. The light emerging from the surface of the second polarizer 7 is plane-polarized, which means that the contrast of the display device through an additional interposed plane polarizer would be dependent on the rotary orientation of this extra polarizer. The additional λ/4 layer 8 on the second polarizer 7, however, causes this light to be circularly polarized, and an interposed plane polarizer will transmit circularly polarized light uniformly and independent of orientation. When the display device is viewed through a plane polarizer, polarizing sunglasses for example, the contrast will therefore no longer be influenced by the orientation of the sunglasses. The display can thus also be read very reliably through polarizing sunglasses. This is particularly important in cases where a display device of this kind is used in vehicles or means of public transport, when the safety of the passengers depends on the ease of reading the display.

It should further be noted that, in addition to the reflecting liquid-crystal display device described, in transmitting devices an interposed λ/4 layer brings about the same improvements. Such transmitting liquid-crystal display devices do not incorporate the diffuse reflector 1. Instead, a light source is located behind the device, the light from which is normally absorbed on passing through the device, and is transmitted when an electric field is applied. For this purpose the two polarizers 2 and 7 are not arranged crosswise, but in parallel.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electro-optical liquid-crystal display device which retains its contrast even when viewed through an intervening plane polarizer, comprising:
   two plane polarizers in spaced relationship;
   an electro-optical layered structure positioned between said two plane polarizers;
   said electro-optical layered structure comprising two parallel transparent plates having electrodes thereon, a layer of nematic liquid crystal positoned between said transparent plates, said nematic liquid crystal being wall-oriented so that the liquid crystal molecule on the surface of the first transparent plate are arranged in one direction and on the surface of the second transparent plate are arranged in another direction perpendicular to the first direction to rotate through 90° the polarization direction of the impinging linearly polarized light as long as no electrical field is applied to said electrodes; and
   a quarter wavelength layer adjacent a first one of said plane polarizers on the viewing side of said display device such that said plane polarizer and said quarter wavelength layer together form a circular polarizer, said first plane polarizer being located between said quarter wavelength layer and said electro-optical layered structure 2. An electro-optical liquid-crystal display device as in claim 1, further comprising:
   reflecting means adjacent the second of said plane polarizer for reflecting light impinging from said viewing side of said display device.

3. An electro-optical liqiud-crystal display device as in claim 1, wherein:
   said two plane polarizers are arranged crosswise, whereby said display reflects incident ambient light when no electric field is applied to said electrodes.

4. An electro-optical liquid-crystal display device as in claim 1, wherein:
   said two plane polarizers are arranged in parallel, whereby said display device transmits light only when an electric field is applied to said electrodes.

5. An electro-optical liquid crystal display device as in claim 1, further comprising:
   light source means located behind said display device for selectively transmitting light through said display device.

* * * * *